(12) United States Patent
Nuyts et al.

(10) Patent No.: US 12,491,867 B2
(45) Date of Patent: Dec. 9, 2025

(54) PARKING SYSTEM

(71) Applicant: NXP B.V., Eindhoven (NL)

(72) Inventors: Wim Nuyts, Leuven (BE); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 151 days.

(21) Appl. No.: 18/496,144

(22) Filed: Oct. 27, 2023

(65) Prior Publication Data
US 2025/0136090 A1    May 1, 2025

(51) Int. Cl.
*B60W 30/06*     (2006.01)
*G08G 1/14*      (2006.01)

(52) U.S. Cl.
CPC ............ *B60W 30/06* (2013.01); *G08G 1/146* (2013.01)

(58) Field of Classification Search
None
See application file for complete search history.

(56) References Cited

U.S. PATENT DOCUMENTS

| | | |
|---|---|---|
| 7,825,827 B2 | 11/2010 | Jang et al. |
| 10,078,789 B2 | 9/2018 | Gupta et al. |
| 10,147,321 B1 | 12/2018 | Nakhjavani |
| 10,625,733 B2 | 4/2020 | Cheaz et al. |
| 11,460,316 B2 | 10/2022 | Abdelaziz |
| 2012/0056758 A1 | 3/2012 | Kuhlman et al. |
| 2015/0039211 A1* | 2/2015 | Stefan ............... B62D 15/0285 701/117 |
| 2015/0279210 A1* | 10/2015 | Zafiroglu ............ G08G 1/143 340/932.2 |
| 2020/0258385 A1 | 8/2020 | Mahajan |
| 2022/0319193 A1 | 10/2022 | Subramanya |
| 2022/0363245 A1* | 11/2022 | Imazu ................. G06V 20/56 |
| 2023/0166725 A1* | 6/2023 | Tsimhoni ............ G06F 3/0482 701/25 |

FOREIGN PATENT DOCUMENTS

| | | |
|---|---|---|
| CN | 101678860 A | 3/2010 |
| CN | 112216136 A | 1/2021 |
| DE | 19951381 A1 | 6/2000 |
| EP | 2953111 A1 | 12/2015 |
| KR | 20170069030 A | 6/2017 |

OTHER PUBLICATIONS

Atif, Yacine et al., "Internet of Things Approach to Cloud-based Smart Car Parking", Procedia Computer Science 98; Jan. 1, 2016; pp. 193-198.
Ji, Zhanlin et al., "A Cloud-Based Intelligent Car Parking Service for Smart Cities", 2014 XXXIth URSI General Assembly and Scientific Symposium (URSI GASS) Aug. 16, 2014; pp. 1-4.
Granatir, Brian et al., "SmartCloud—Normalizing IoT Data for Event-Driven Architectures", White Paper, Smart Parking Ltd 2018; downloaded from <https://www.smartparking.com/smartpark-system/smart-cloud> on Aug. 16, 2023; 5 pages. No document date available.

* cited by examiner

*Primary Examiner* — John F Mortell (57) ABSTRACT

A parking system for automatically rearranging at least one parked vehicle at a parking location in response to the at least one parked vehicle receiving a signal from an arriving vehicle indicating an intent to park at the parking location. The parked vehicle employs an autonomous driving and parking system to exit its current parking location and re-park so as to create more space for the arriving vehicle. The system increases the likelihood that the arriving vehicle is able to find space for parking, thus improving the driver experience.

20 Claims, 5 Drawing Sheets

PARKING SYSTEM

BACKGROUND

There are different parking resources to assist with parking in a parking area. Some parking areas implement signs, parking lights, numbered space indicators, or any combination of these methods. These parking methods assist drivers in identifying the availability of a parking space. Obtaining a parking space during parking is often difficult for different reasons. For example, it is often difficult to obtain a parking space when the parking area is full of vehicles, or the parking spaces are used in an inefficient manner such that some vehicles are parked to overlap more than one parking space. In most cases, parked vehicles are left unoccupied, which can cause problems for someone seeking a parking space.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques and systems for automatically rearranging at least one parked vehicle at a parking location in response to the at least one parked vehicle receiving a signal from an arriving vehicle indicating an intent to park at the parking location. For example, the parked vehicle employs an autonomous driving and parking system to exit its current parking location and re-park so as to create more space for the arriving vehicle. The techniques and systems described herein thereby increase the likelihood that the arriving vehicle is able to find space for parking, thus improving the driver experience.

To illustrate via an example, in some cases, vehicles are parked at angles within a parking space that makes it difficult for other vehicles to park around. Additionally, some vehicles are parked that overlap with other parking spaces. Accordingly, in at least some cases the vehicles are parked in such a way that the overall amount of parking space is used inefficiently, and does not accommodate the highest number of vehicles that could be parked in the overall space. In addition, many vehicles are developed with automatic driving and parking systems that are capable of controlling the corresponding vehicle autonomously. It will be appreciated that automatic driving is used interchangeably with autonomous and/or autonomous vehicles. For example, autonomous vehicles are capable of parking in a parking space or being summoned by an owner. Specifically, in order to detect a surrounding environment, the autonomous vehicles include sensors, such as cameras, radar, lidar, and the like. Additionally, the autonomous vehicles include a processing device, such as a processor, a microcontroller, a multi-core processor, a graphics processing unit (GPU), and/or any other type of parallel processing device. The processing device execute a software application tangibly embodied on a non-transitory computer-readable medium, such as random-access memory (RAM), non-volatile memory, such as flash memory, magnetic disk storage device, optical disk storage device, or a combination thereof and stores data on behalf of the processing device. Furthermore, in some embodiments, the autonomous vehicles use computer vision, artificial intelligence (AI), machine learning, deep learning, and the like, to learn about the surrounding environment. The processing device within the autonomous vehicles control a driving system including, for example, a steering wheel, an accelerator pedal, a brake pedal, and/or a turn signal based on data received from the sensors. Therefore, the at least one parked vehicle autonomously moves and communicates to create the parking space in cooperation with the arriving vehicle and other surrounding vehicles that also autonomously operate.

To start, for example, the at least one parked vehicle analyzes useable space at the parking location to determine whether a parking space can be created based on the useable space, which includes any space between other vehicles and any non-movable objects (e.g., trees, statues, stone blocks, sidewalks, poles, buildings, pillars, non-communicating vehicles) around the at least one parked vehicle. Stated differently, analysis of the useable space by the at least one parked vehicle is based on data of the surrounding environment received by the processing device from the sensors. The sensors of the at least one parked vehicle detect gaps (i.e., space) between the at least one parked vehicle, at least one other parked vehicle, and/or the non-movable objects. Moreover, in some embodiments, the at least one parked vehicle has a map of the parking location stored within a memory unit. As such, the processing device within the at least one parked vehicle compares the map to the data to identify a direction and/or a position to move the at least one parked vehicle. If the at least one parked vehicle determines the parking space that can be created from the useable space is large enough to fit the arriving vehicle, then the at least one parked vehicle automatically moves to rearrange itself to create the parking space.

In some embodiments, during analysis and/or calculation of the useable space, the at least one parked vehicle includes space between other vehicles and positioning of non-movable objects that has been detected by the sensors and the data sent to the processing device for analysis and/or calculation to determine whether the parking space can be made. For example, trees, statues, and stone blocks cannot be moved. Similarly, non-communicating vehicles are also unable to be moved. Non-communicating vehicles include any vehicles that have no communication ability with the at least one parked vehicle and any vehicles that have communication ability, but for some reason are unresponsive to the at least one parked vehicle. The at least one parked vehicle broadcasts at least one handshake signal to at least one other vehicle in response to receiving the signal from the arriving vehicle of the intent to park. In some embodiments, the at least one handshake signal includes a request for confirmation of autonomous control and communication status. The at least one parked vehicle sends the at least one handshake signal to await a return signal indicating the at least one other vehicle is a communicating vehicle, which also confirms the communication status. Accordingly, if the at least one vehicle does not respond, then the at least one parked vehicle identifies as having no communication ability. Also, the communicating vehicle confirms to the at least one parked vehicle whether the communicating vehicle has autonomous control. Therefore, non-communicating vehicles and/or vehicles without autonomous control would also be categorized as non-movable objects.

In some embodiments, the arriving vehicle and the at least one parked vehicle are connected to a cloud service. The cloud service facilitates communications between the arriving vehicle and the at least one parked vehicle. For example, the cloud service stores parking information about the parking location, the arriving vehicle, and the at least one parked vehicle, such as capacity of the parking location, positioning of the at least one parked vehicle within the parking location, and dimensions of the arriving vehicle and the at least one parked vehicle. The at least one parked vehicle updates the arriving vehicle about the availability of the parking space over the cloud service in response to determining whether the parking space that can be created from the useable space is large enough to fit the arriving vehicle. Alternatively, the cloud service updates the arriving vehicle about the availability of a parking space in response to referencing the parking information. Thus, the arriving vehicle is quickly notified whether the parking location can be used.

Unlike a traditional parking scenario of a driver searching for a parking space, by using the techniques described herein the at least one parked vehicle creates a parking space at the parking location for the arriving vehicle by automatically moving at least the at least one parked vehicle and any other vehicle that responds to communications from the at least one parked vehicle and has some autonomous control. For example, the at least one parked vehicle and any other vehicle that communicates adjusts positioning, such as automatically moving closer to each other and reducing any gaps between each other to create the parking space for the arriving vehicle. Therefore, the useable space for storing vehicles within the parking location is optimized through rearrangement of the at least one parked vehicle at the parking location.

Figure 1:
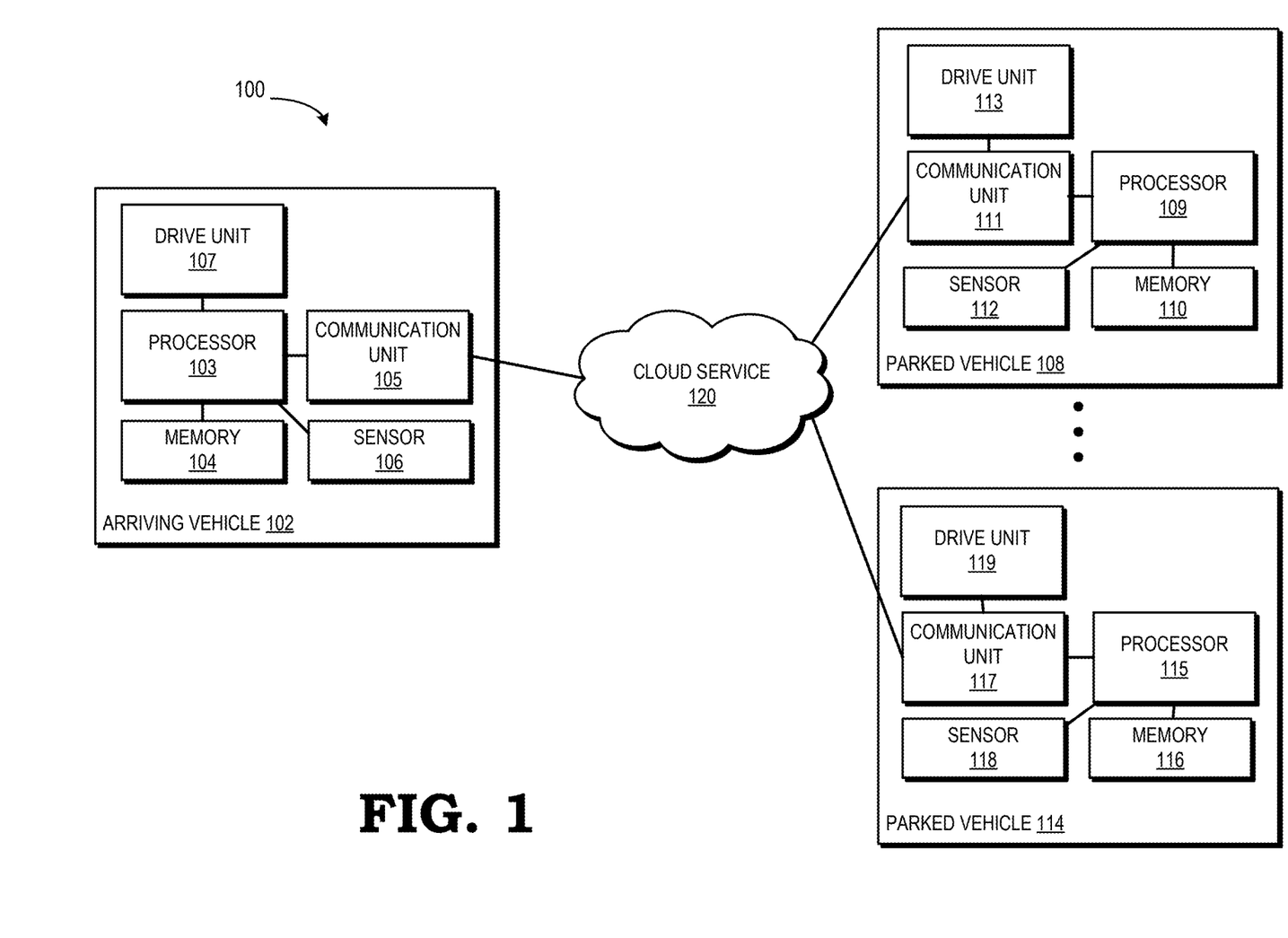
FIG. 1 is a block diagram of a parking system including vehicles that automatically create a parking space based on useable space at a parking location in accordance with some embodiments.

FIG. 1 illustrates a block diagram of a parking area rearrangement system 100 comprising vehicles that automatically create a parking space based on useable space at a parking location in accordance with some embodiments. The parking area rearrangement system 100 is a system that generally executes sets of computer instructions (e.g., computer programs) to carry out tasks on behalf of at least one vehicle. In some embodiments, the parking area rearrangement system 100 includes a plurality of autonomous vehicles that are interconnected. Each of the plurality of autonomous vehicles include any autonomous vehicle that automatically moves and/or automatically communicates with other autonomous vehicles to automatically determine the useable space and automatically create the parking space based on the useable space. As described further herein, each of the plurality of autonomous vehicles in the parking area rearrangement system 100 keep track of each other vehicle and the surrounding area in order to create the parking space from the useable space.

In the depicted example, the parking area rearrangement system 100 includes an arriving vehicle 102 and a plurality of parked vehicles 108 and 114. However, in other embodiments, there are more than two parked vehicles. To support execution of computer instructions, the arriving vehicle 102 includes a processor 103 and a memory 104. The processor 103 is a processing device such as a central processing unit (CPU) that includes one or more processor cores and supporting circuitry to execute computer instructions, such as input/output (I/O) connectors connected to at least one input device, such as a touchscreen display, a keyboard, a keypad, a mouse, a microphone, a gesture sensor, and any combination thereof. The memory 104 is volatile memory, such as random-access memory (RAM), non-volatile memory, such as flash memory, magnetic disk storage device, optical disk storage device, or a combination thereof and stores data on behalf of the processor 103. Accordingly, as the processor 103 executes instructions, data (including instructions and operand data) is written to and read from memory 104. It will be appreciated that while the memory 104 is illustrated as separate from the processor 103, in some embodiments, all or a portion of the memory 104 is a part of the processor 103 and is incorporated in the same semiconductor die or semiconductor package as the processor 103.

The arriving vehicle 102 further includes a communication unit 105, at least one sensor 106, and a drive unit 107. The communication unit 105 is a communication device that communicates to at least one other communication unit 105 either through a wired connection or a wireless connection. For example, in different embodiments, the communication unit 105 includes a network controller, a wire, an antenna, or a combination thereof that communicates over a network, such as a cellular network, 4G, 5G, LTE, Wi-Fi, radio frequency, high speed serial bus, Bluetooth®, and the like. The network controller is connected to (or otherwise in communication with) and controls access to any number and type of communication devices. Therefore, the communication unit 105 transmits and/or receives instructions and/or data from the processor 103, including communications to at least one other vehicle as will be described in detail below.

The at least one sensor 106 is a sensor used to detect information around the arriving vehicle 102. In some embodiments, the at least one sensor 106 is at least one of an image sensor (e.g., camera), a proximity sensor (e.g., ultrasonic), a movement sensor (e.g., radar, lidar), and the like. The at least one sensor 106 detects information surrounding the arriving vehicle 102. For example, the at least one sensor 106 performs at least one of captures an image of a surrounding environment, detects proximity to at least one other vehicle, non-movable objects, at least one person or animal, or detects movement of the at least one other vehicle and/or the at least one person or animal. Subsequently, the at least one sensor 106 sends the detected information to the processor 103. Accordingly, the processor 103 sends drive commands to the drive unit 107 based on the detected information.

The drive unit 107 includes at least one engine, a plurality of wheels, at least one axle, a steering system, a power source, and the like. Therefore, the drive unit 107 includes all components required to move the arriving vehicle 102. In some embodiments, the drive unit 107 is controlled by the processor 103, such that the arriving vehicle 102 is at least partially autonomous. More specifically, the processor 103 issues commands to the drive unit 107 to move the arriving vehicle 102, such as driving forward, driving backward, turning left, turning right, braking, using a turn signal, and the like.

During operation, for example, the drive unit 107 stops the arriving vehicle 102 in response to the processor 103 determining one or more non-movable objects, other vehicles, persons, and/or animals are surrounding the arriving vehicle 102 and prevent movement. However, the drive unit 107 moves (i.e., drives) the arriving vehicle 102 in response to the processor 103 determining there are no obstructions around the arriving vehicle 102, such as a lack of non-movable objects, other vehicles, persons, or animals.

The parked vehicle 108 includes a processor 109, a memory 110, a communication unit 111, at least one sensor 112, and a drive unit 113. Similarly, the parked vehicle 114 includes a processor 115, a memory 116, a communication unit 117, at least one sensor 118, and a drive unit 119. Each component of the parked vehicle 108 and the parked vehicle 114 is similar to each component of the arriving vehicle 102. Therefore, for sake of brevity, the descriptions of the components of the parked vehicle 108 and the parked vehicle 114 are omitted. However, for comparison, the processor 109 and the processor 115 correspond to and operate similarly to the processor 103. The memory 110 and the memory 116 correspond to and operate similarly to the memory 104. The communication unit 111 and the communication unit 117 correspond to and operate similarly to the communication unit 105. The at least one sensor 112 and the at least one sensor 118 correspond to and operate similarly to the at least one sensor 106. Finally, the drive unit 113 and the drive unit 119 correspond to and operate similarly to the drive unit 107. As such, the arriving vehicle 102, the parked vehicle 108, and the parked vehicle 114 operate similarly to each other and are described based on positioning within the parking location. Stated differently, the arriving vehicle 102 becomes a parked vehicle once parked in the parking location, while the parked vehicle 108 and/or the parked vehicle 114 become an arriving vehicle after leaving the parking location and approaching another parking location.

In the depicted example, the communication unit 111 and/or the communication unit 117 receives a first communication signal from the communication unit 105 (i.e., vehicle-to-vehicle, V2V communication) indicating the arriving vehicle 102 intends to park within the parking location. The communication unit 111 and/or the communication unit 117 transfer the communication signal to the processor 109 and the processor 115, respectively. Subsequently, the processor 109 and/or the processor 115 send a sensor command to the at least one sensor 112 and the at least one sensor 118, respectively. The at least one sensor 112 and/or the at least one sensor 118 detect the surrounding environment around the parked vehicle 108 and the parked vehicle 114, respectively. For example, the at least one sensor 112 and/or the at least one sensor 118 stores an image of the surrounding environment, detects proximity to at least one other vehicle, detects proximity to non-movable objects, detects proximity to at least one person or animal, or detects movement of the at least one other vehicle and/or the at least one person or animal. Additionally, in some embodiments, the at least one sensor 112 and/or the at least one sensor 118 implement radar and/or lidar to detect distance to at least one other vehicle, the non-movable objects, and/or at least one person or animal. Accordingly, the processor 109 and the processor 115 calculate any space between each of those objects based on the distance between the at least one other vehicle, the non-movable objects, and/or the at least one person or animal.

Furthermore, the communication unit 111 and/or the communication unit 117 send at least one second communication signal between each other. Specifically, the communication unit 111 and/or the communication unit 117 initialize a handshake process by sending the at least one second communication signal between each other, such that the parked vehicle 108 and the parked vehicle 114 confirm that each is a communicating vehicle in response to receiving the at least one second communication signal and sending an acknowledgement to the other. However, the parked vehicle 108 and/or the parked vehicle 114 identify the other as a non-communicating vehicle in response to a failure to receive the at least one second communication signal.

Similarly, the parked vehicle 108 and the parked vehicle 114 engage in another handshake process with the arriving vehicle 102 and/or any other vehicle in order to determine whether communication is possible. It will be appreciated that the arriving vehicle 102, the parked vehicle 108, and/or the parked vehicle 114 are identified as a non-communicating vehicle whether the vehicle is currently unresponsive to communication or never was responsive to communication, which could be a result of, for example, a disabled communication unit, a broken communication unit, and/or damage to the communication unit, and the like. Moreover, the parked vehicle 108 and/or the parked vehicle 114 identify any other unresponsive vehicle, object, and/or at least one person or animal as a non-communicating vehicle and a non-movable object. In response to identification as a non-communicating vehicle, the parked vehicle 108 and/or the parked vehicle 114 determine that transfer of instructions, commands, and/or other data is not receivable by the non-communicating vehicle, and therefore, the non-communicating vehicle cannot be controlled or sent instructions to move to create the parking space.

The at least one sensor 112 and/or the at least one sensor 118 are each a sensor used to detect information around the parked vehicle 108 and/or the parked vehicle 114, respectively. In some embodiments, the at least one sensor 112 and/or the at least one sensor 118 are an image sensor (e.g., camera), a proximity sensor (e.g., ultrasonic), a movement sensor (e.g., radar, lidar), and the like. The at least one sensor 112 and/or the at least one sensor 118 detect information surrounding the parked vehicle 108 and/or the parked vehicle 114, respectively. Thus, the at least one sensor 112 and/or the at least one sensor 118 detect information similar to the at least one sensor 106. Accordingly, the processor 109 and/or the processor 115 send drive commands to the drive unit 113 and/or the drive unit 119, respectively, based on the detected information.

In some cases, the processor 103 receives notification of an intent to park by a driver within the arriving vehicle 102. In some embodiments, the driver notifies the processor 103 through direct input within the arriving vehicle 102 or using a remote controller, such as a key, a fob, a smartphone with a vehicle software application, and the like. The communication unit 105 sends the intent to park to one or more vehicles within communication range, such as a parked vehicle 108 and a parked vehicle 114.

The drive unit 113 and/or the drive unit 119 move the parked vehicle 108 and/or the parked vehicle 114, respectively, in response to determination of useable space by the processor 109 and/or the processor 115 based on the detected information described above. Specifically, the processor 109 and/or the processor 115 determine the useable space from gaps detected between the parked vehicle 108, the parked vehicle 114, at least one other parked vehicle, and/or any non-movable object. Additionally, using communication units, the processor 109 and/or the processor 115 transfer dimensions (e.g., length, width, height) of the parked vehicle 108 and the parked vehicle 114, respectively, to each other, such that the parked vehicle 108 receives dimensions of the parked vehicle 114, and the parked vehicle 114 receives dimensions of the parked vehicle 108. Thus, the parked vehicle 108 and/or the parked vehicle 114 include the dimensions of each vehicle during calculation of the useable space prior to movement. Moreover, in some embodiments, the parked vehicle 108 and/or the parked vehicle 114 have a map of the parking location stored within a memory unit. As such, the processor 109 and/or the processor 115 compare the map to the detected information to identify a direction and/or a position to move the parked vehicle 108 and/or the parked vehicle 114. For example, the parked vehicle 108 and/or the parked vehicle 114 move in a first lateral direction (e.g., forward), a second lateral direction (e.g., backward), a first rotational direction (e.g., right) with respect to a perpendicular axis to the vehicle, and/or a second rotational direction (e.g., left) with respect to the perpendicular axis to the vehicle to create a parking space in response to the processor 109 and/or the processor 115 determining the useable space that existed prior to movement fits the arriving vehicle 102. Stated differently, for example, the parked vehicle 108 and/or the parked vehicle 114 determine the total useable space that exceeds the dimensions of the arriving vehicle 102 including length, width, and height, and then move accordingly to create the parking space.

In some embodiments, the arriving vehicle 102, the parked vehicle 108, and/or the parked vehicle 114 are at least partially autonomous. In other words, for example, the arriving vehicle 102, the parked vehicle 108, and/or the parked vehicle 114 automatically analyze the surrounding environment, automatically determine the useable space to create a parking space, and/or automatically move in response to the parked vehicle 108 and/or the parked vehicle 114 determining the parking space created from the useable space receives the arriving vehicle 102. However, the parked vehicle 108 and/or the parked vehicle 114 notify the arriving vehicle 102 the parking space cannot be created in response to, for example, the useable space being less than the dimensions of the arriving vehicle 102, an insufficient number of the plurality of vehicles within the parking location cannot be moved to create the parking space, the positioning of the non-communicating vehicles and/or the non-movable objects in the surrounding environment prevent creation of the parking space, and any combination thereof.

In other embodiments, the at least one sensor 112 and/or the at least one sensor 118 detect for presence of at least one other vehicle within a threshold distance of the parked vehicle 108 and/or the parked vehicle 114, respectively. In some embodiments, the parked vehicle 108 and/or the parked vehicle 114 send at least one second communication signal to the at least one other vehicle to determine whether the at least one other vehicle is a communicating vehicle, such that the parked vehicle 108 and/or the parked vehicle 114 issue commands for the at least one other vehicle to depart in response to determination of receipt of communication. Moreover, the parked vehicle 108 and/or the parked vehicle 114 automatically delay movement to create the parking space in response to the at least one other vehicle being within the threshold distance and/or failure of the at least one other vehicle to receive the communication to depart the threshold distance. As such, the parked vehicle 108 and/or the parked vehicle 114 delay creation of the parking space until the arriving vehicle 102 is within the threshold distance and/or the at least one other vehicle has moved away from the threshold distance.

In the depicted example, the arriving vehicle 102 is connected to the parked vehicle 108 and/or the parked vehicle 114 over a cloud service 120 (i.e., vehicle-to-everything, V2X). The cloud service 120 includes an online network of computer devices, servers, storage devices, cloud storage, and the like. In some embodiments, the cloud service 120 is a third-party service that stores parking information on the arriving vehicle 102, the parked vehicle 108, the parked vehicle 114, and/or the parking location. For example, the cloud service 120 stores the parking information about the parking location, the arriving vehicle 102, the parked vehicle 108, the parked vehicle 114, capacity of the parking location, dimensions of the arriving vehicle 102, dimensions of the parked vehicle 108, and/or dimensions of the parked vehicle 114. Additionally, the cloud service 120 updates the parking information based on arrival or departure of all vehicles within the parking location.

In other embodiments, the cloud service 120 stores the map of the parking location. Thus, the parked vehicle 108 and/or the parked vehicle 114 retrieve the map from the cloud service 120 to include a layout of the parking location during determination of the useable space. As such, the processor 109 and/or the processor 115 compare the map to the detected information to identify a direction and/or a position to move the parked vehicle 108 and/or the parked vehicle 114.

In other embodiments, the cloud service 120 includes a tiered level of service. Specifically, the cloud service 120 implements subscription plans to provide different levels of service based on the subscription. For example, a basic level of service includes access to the cloud service 120 and/or ability to communicate to other vehicles over the cloud service 120. An intermediate level of service includes everything in the basic level of service plus notifications of availability of the useable space prior to arrival of the arriving vehicle 102 to the parking location. Finally, a premium level of service includes everything in the intermediate level plus priority parking. In particular, the priority parking gives a subscriber priority over lower tiers for the parking space. For example, a first arriving vehicle 102 with the basic level of service arrives to the parking location and indicates intent to park to the parked vehicle 108 and/or the parked vehicle 114, while a second arriving vehicle 102 with the premium level of service arrives to the parking location and indicates intent to park to the parked vehicle 108 and/or the parked vehicle 114. Regardless of the vehicle that arrived first and proximity to an intended parking space, the second arriving vehicle 102 receives priority and the parked vehicle 108 and/or the parked vehicle 114 move to create the parking space for the second arriving vehicle 102. However, the parked vehicle 108 and/or the parked vehicle 114 move based on first to arrive and/or proximity to the intended parking space in response to a conflict based on each of the arriving vehicles having the premium level of service.

In different embodiments, the cloud service 120 is not used. Instead, the arriving vehicle 102 communicates directly to the parked vehicle 108 and/or the parked vehicle 114 over a cellular network, 4G, 5G, LTE, Wi-Fi, radio frequency, high speed serial bus, Bluetooth®, and the like. Accordingly, in absence of the cloud service 120 the tiered level of service would not be implemented.

Figure 2:
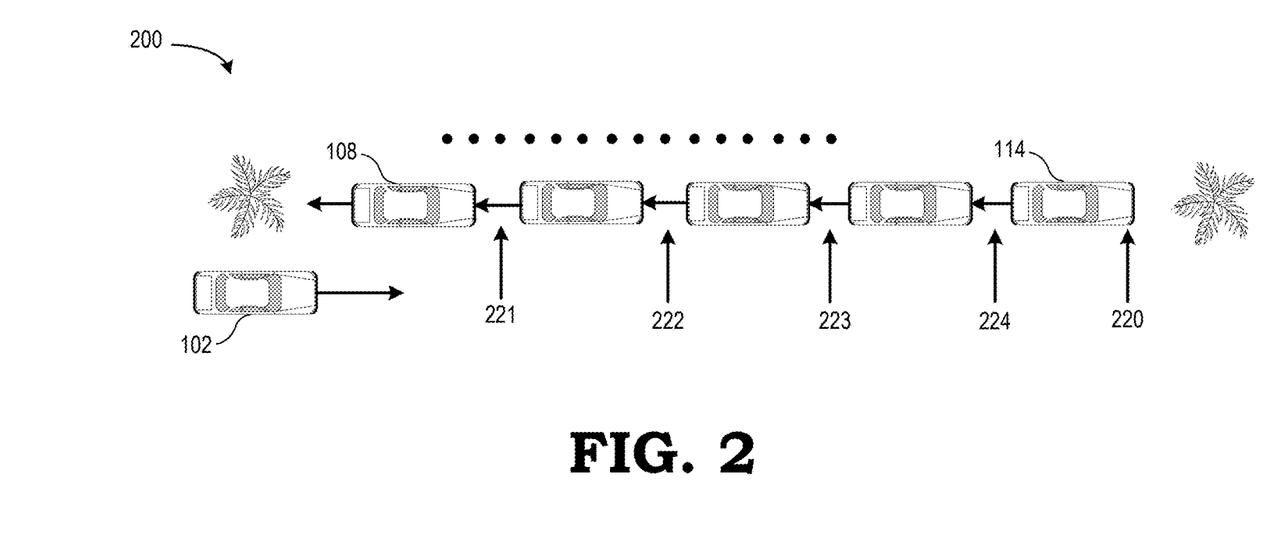
FIG. 2 is a diagram illustrating an example of the parking system of FIG. 1 automatically determining useable space based on a safety margin between each of the plurality of vehicles in accordance with some embodiments.

FIG. 2 illustrates the parking system 100 automatically determining the useable space based on a safety margin between each of the plurality of vehicles in accordance with some embodiments. In the depicted example, the parked vehicle 108 and the parked vehicle 114 are parked in a parallel parking configuration at a parking location 200. Moreover, the parked vehicle 108 and/or the parked vehicle 114 are parked with a plurality of other vehicles having the safety margin between each of the plurality of vehicles. Accordingly, the parking location 200 includes a first safety margin 221, a second safety margin 222, a third safety margin 223, and a fourth safety margin 224. The arriving vehicle 102 arrives at the parking location 200 and sends a signal communicating intent to park to the parked vehicle 108 and/or the parked vehicle 114 within the parking location 200. The parked vehicle 108 and/or the parked vehicle 114 automatically determine whether each of the plurality of vehicles is a communicating vehicle to identify which of the plurality of vehicles is capable of receiving instructions and/or moving in response to receiving the instructions. The parked vehicle 108 and/or the parked vehicle 114 broadcast at least one handshake signal to at least one other vehicle, including the arriving vehicle 102, in response to receiving the signal from the arriving vehicle 102 of the intent to park. In some embodiments, the at least one handshake signal includes a request for confirmation of autonomous control and communication status. The parked vehicle 108 and/or the parked vehicle 114 send the at least one handshake signal to identify which surrounding vehicles communicate, are receptive to instructions, and/or are autonomous. The parked vehicle 108 and/or the parked vehicle 114 await a return signal indicating the at least one other vehicle is a communicating vehicle, which also confirms the communication status. Accordingly, the parked vehicle 108 and/or the parked vehicle 114 identify any vehicle as being a non-communicating vehicle in response to a failure of the at least one other vehicle sending the return signal within a threshold time period (e.g., one minute, two minutes, three minutes, five minutes). Furthermore, the parked vehicle 108 and/or the parked vehicle 114 identify any vehicle as being a non-communicating vehicle in response to the at least one other vehicle indicating a lack of autonomous control. In this case, lack of autonomous control includes vehicles that do not have any form of autonomous control or have autonomous control, but the autonomous system of the at least one other vehicle is not working at the time the at least one handshake signal was received.

Therefore, the parked vehicle 108 and/or the parked vehicle 114 identify any non-communicating vehicle as incapable of receiving instruction to move, which must be included as requiring movement of the parked vehicle 108 and/or the parked vehicle 114 around any non-communicating vehicle. Also, the parked vehicle 108 and/or the parked vehicle 114 update the cloud service 120 based on the detected information, such that the cloud service 120 updates all other cars with updated information about the parking location.

The arriving vehicle 102 sends dimensions (e.g., length, width, height) of the arriving vehicle 102 to the parked vehicle 108, the parked vehicle 114, and/or the plurality of vehicles that are identified as communicating vehicles. The parked vehicle 108 and/or the parked vehicle 114 include the dimensions of the arriving vehicle 102 during calculation of the useable space, as well as, the gap between the parked vehicle 108, the parked vehicle 114, and any other vehicle, dimensions of the parked vehicle 108, dimensions of the parked vehicle 114, non-movable objects, and/or non-communicating vehicles. In some embodiments, the parked vehicle 108 and/or the parked vehicle 114 include height of any vehicle in the calculation based on the parking location. For example, the parked vehicle 108 and/or the parked vehicle 114 create the parking space in response to the height of the arriving vehicle 102 being less than a height of a ceiling at the parking location. Alternatively, the parked vehicle 108 and/or the parked vehicle 114 communicate to the arriving vehicle 102 that the parking space cannot be created in response to the height of the arriving vehicle 102 equivalent to or exceeding the height of the ceiling at the parking location. Accordingly, the parked vehicle 108 and/or the parked vehicle 114 determine whether the parking space created will exceeds the dimensions of the arriving vehicle 102. For sake of brevity, further references to the parked vehicle 108 and/or the parked vehicle 114 include any of the plurality of vehicles that are communicating vehicles. The parked vehicle 108 and/or the parked vehicle 114 send orientation information of each vehicle within the parking location 200 to the arriving vehicle 102, such that the arriving vehicle 102 moves and/or parks within the parking location 200 based on the orientation of the parked vehicle 108 and the parked vehicle 114 within the parking location 200, such as the parallel parking configuration. Stated differently, the arriving vehicle 102 receives the orientation information from the parked vehicle 108 and/or the parked vehicle 114 in order to park similarly within the parking location 200 as the parked vehicle 108 and/or the parked vehicle 114. For example, the parked vehicle 108 and/or the parked vehicle 114 send orientation of being parallel parking as depicted in FIG. 2.

The parked vehicle 108 and/or the parked vehicle 114 automatically calculate the useable space based on the first safety margin 221, the second safety margin 222, the third safety margin 223, and/or the fourth safety margin 224. During automatic calculation of the useable space, the parked vehicle 108 and/or the parked vehicle 114 determine a measurement of distance between each vehicle in response to detection of the distance by the at least one sensor 112 and/or the at least one sensor 118. In other words, the at least one sensor 112 and/or the at least one sensor 118 detect the distance from the parked vehicle 108 to the parked vehicle 114, any other vehicle, and/or a non-movable object. In some embodiments, the parked vehicle 108 and/or the parked vehicle 114 determine the measure of distance prior to automatic calculation of the useable, such as, for example, while the parked vehicle 108 and/or the parked vehicle 114 are already parked in the parking location 200 before the arriving vehicle 102 arrived. The parked vehicle 108 and/or the parked vehicle 114 communicate the measurement of the distance to each other in order to identify the useable space based on a total of the distance, such as, for example, the total of the first safety margin 221, the second safety margin 222, the third safety margin 223, and/or the fourth safety margin 224. As such, the parked vehicle 108 and/or the parked vehicle 114 automatically determine the useable space based on the dimensions of the arriving vehicle 102, the dimensions of the parked vehicle 108, the parked vehicle 114, the first safety margin 221, the second safety margin 222, the third safety margin 223, and/or the fourth safety margin 224 to create the parking space. Furthermore, the parked vehicle 108 and/or the parked vehicle 114 determine whether the useable space exceeds the dimensions of the arriving vehicle 102 to ensure that movement of the parked vehicle 108 and/or the parked vehicle 114 creates a parking space that receives (i.e., big enough to fit) the arriving vehicle 102. The parked vehicle 108 and/or the parked vehicle 114 identify a parking space 220 availability in response to determining the useable space exceeds the dimensions of the arriving vehicle 102.

Figure 3:
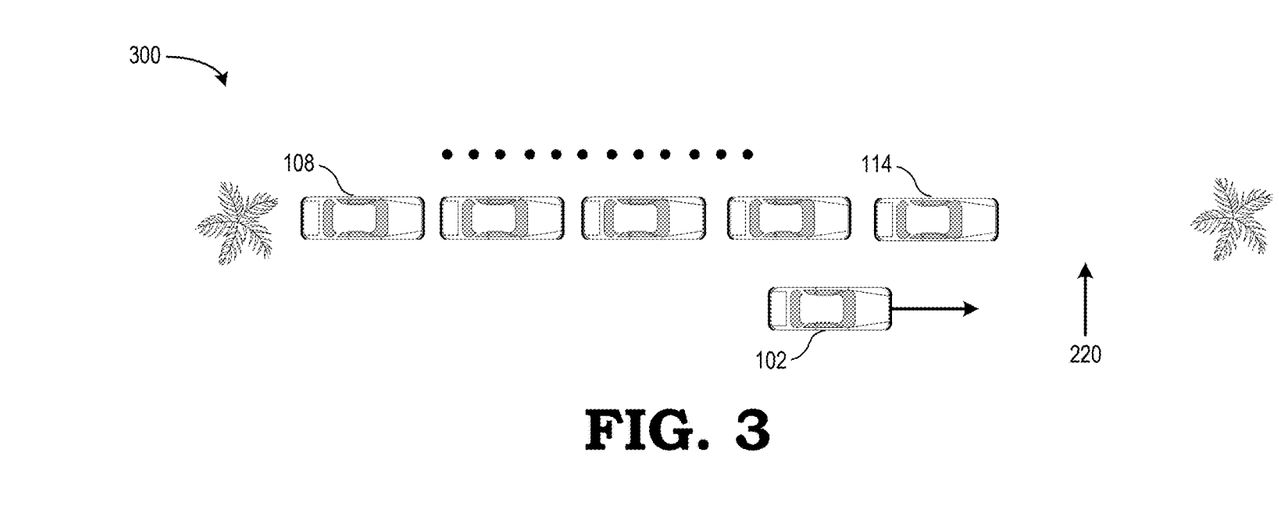
FIG. 3 is a diagram illustrating an example of the parking system of FIG. 1 automatically moving vehicles to create a parking space for the arriving vehicle using the safety margin between each of the plurality of vehicles as the useable space in accordance with some embodiments.

FIG. 3 illustrates the parking system 100 automatically moving the parked vehicle 108 and the parked vehicle 114 to create the parking space for the arriving vehicle 102 using the safety margin between each of the plurality of vehicles as the useable space in accordance with some embodiments. In the depicted example, the parked vehicle 108 and the parked vehicle 114 are parked in a parallel parking configuration at a parking location 300. Specifically, FIG. 3 shows movement of the plurality of vehicles from FIG. 2. Referring to FIGS. 2 and 3, the parked vehicle 108 automatically moves (i.e., drives) in a lateral direction (e.g., reverse) toward a bush and stops within a threshold distance of the bush. The processor 109 provides the threshold distance based on a preconfigured criteria, such as an algorithm installed during manufacture of the parked vehicle 108 and/or an artificial intelligence (AI) application/hardware, machine learning, or any software that enables learning for autonomous driving and is included during driving and/or parking of the parked vehicle 108. Subsequently, each of the plurality of vehicles and the parked vehicle 114 automatically move in the lateral direction, similar as the parked vehicle 108, and stop. For example, a second of the plurality of vehicles moves in the lateral direction toward the parked vehicle 108 and stops within the threshold distance of the parked vehicle 108 and a third of the plurality of vehicles moves in the lateral direction toward the second of the plurality of vehicles and stops within the threshold distance of the second of the plurality of vehicles. As such, the plurality of vehicles continue the same movement steps until the parked vehicle 114 is reached and finishes the process, leaving the parking space for the arriving vehicle 102. Accordingly, the parked vehicle 108 and/or the parked vehicle 114 automatically move to adjust the useable space to create the parking space 220 in response to determining the useable space exceeds the dimensions of the arriving vehicle 102.

Figure 4:
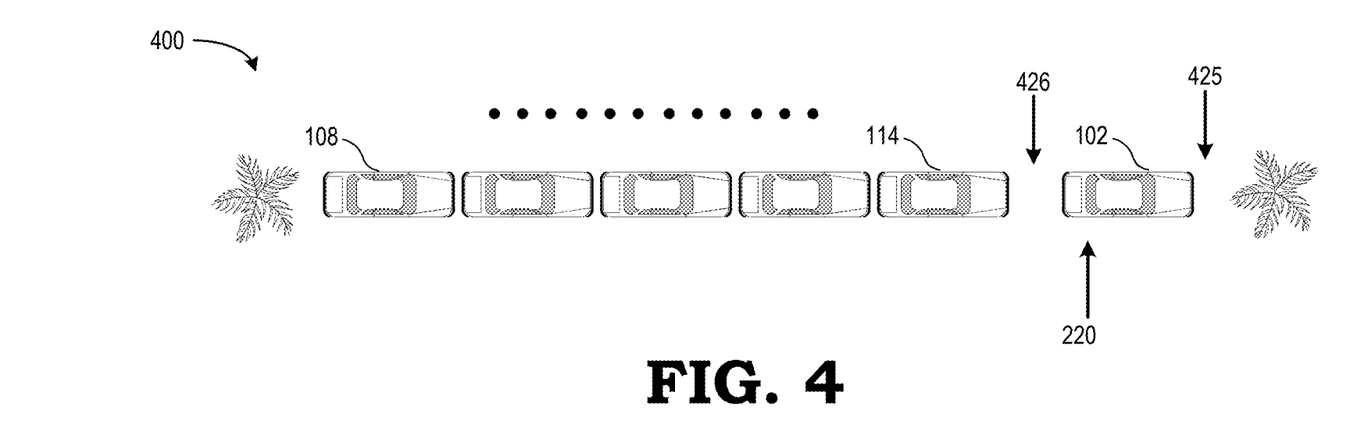
FIG. 4 is a diagram illustrating an example of the parking system of FIG. 1 after the arriving vehicle has automatically parked in the parking space created by the automatic movement of the plurality of vehicles in FIG. 4 in accordance with some embodiments.

FIG. 4 illustrates the parking system 100 after the arriving vehicle 102 has parked in the parking space 220 created by movement of the parked vehicle 108 and/or the parked vehicle 114 in FIG. 3 in accordance with some embodiments. In the depicted example, the parked vehicle 108 and the parked vehicle 114 are parked in a parallel parking configuration at a parking location 400. Thus, the arriving vehicle 102 automatically moves and/or parks within the parking space 220 after the parked vehicle 108 and/or the parked vehicle 114 automatically move to create the parking space 220. In different embodiments, the arriving vehicle 102 automatically moves to park in response to at least one input from a driver and after the driver has exited the arriving vehicle 102, such as an automatic parking input on a touchscreen display, a keyboard, a keypad, a mouse, a microphone, a gesture sensor, and any combination thereof using a console within the arriving vehicle 102, a key of the arriving vehicle 102, and/or a fob of the arriving vehicle 102.

In other embodiments, the arriving vehicle 102 automatically moves and/or parks in response to detecting all passengers within the arriving vehicle 102 have exited. Furthermore, the arriving vehicle 102 automatically adjusts positioning by moving in a first lateral direction (i.e., forward) or a second lateral direction (i.e., backward) to create another first safety margin 425 and another second safety margin 426. Subsequently, the arriving vehicle 102, the parked vehicle 108, and/or the parked vehicle 114 automatically adjust positioning to create safety margins similar to the safety margins as illustrated in FIG. 2. Accordingly, in some embodiments, the implementation of the safety margins facilitates entry or departure from the parking location 200, the parking location 300, and/or the parking location 400.

Figure 5:
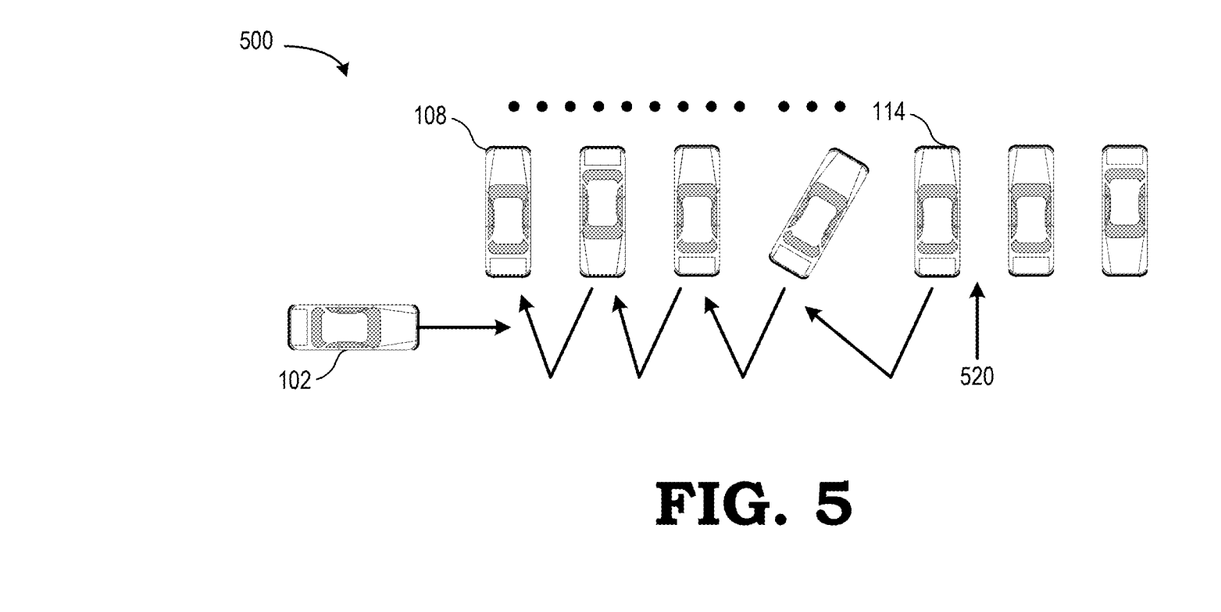
FIG. 5 is a diagram illustrating an example of the parking system of FIG. 1 automatically determining useable space based on orientations of a plurality of parked vehicles at a parking location prior to each of the plurality of parked vehicles automatically moving to create a parking space in accordance with some embodiments.

FIG. 5 illustrates an example of the parking system 100 automatically determining the useable space based on orientations of the plurality of parked vehicles at a perpendicular parking location 500 prior to each of the plurality of parked vehicles automatically moving to create the parking space in accordance with some embodiments. In the depicted example, the arriving vehicle 102 is approaching the perpendicular parking location 500 with a plurality of parked vehicles in different orientations. It will be appreciated that perpendicular parking (a.k.a., nose-in parking, bay parking) refers to any parking location where vehicles within the parking location are parked perpendicular with respect to a curb or any other natural alignment and each vehicle is parked side-by-side with at least one other vehicle. In the depicted example, the parked vehicle 108 and the parked vehicle 114 are parked in a perpendicular parking configuration at a parking location 500. Moreover, the parked vehicle 108 and/or the parked vehicle 114 are parked with a plurality of other vehicles having different orientations and/or gaps between each of the plurality of vehicles. Similar to the scenario described above with respect to FIG. 2, the arriving vehicle 102 arrives at the parking location 500 and communicates intent to park to the parked vehicle 108 and/or the parked vehicle 114 within the parking location 500. The parked vehicle 108 and/or the parked vehicle 114 automatically determine whether each of the plurality of vehicles is a communicating vehicle to identify which of the plurality of vehicles is capable of receiving instructions and/or moving in response to receiving the instructions. The arriving vehicle 102 sends dimensions (e.g., length, width, height) to the parked vehicle 108 and/or the parked vehicle 114 based on whether the vehicles are identified as communicating vehicles. The parked vehicle 108 and/or the parked vehicle 114 send orientation information of each vehicle within the parking location 500 to the arriving vehicle 102, such that the arriving vehicle 102 automatically moves and/or parks within the parking location 500 based on the orientation of the parked vehicle 108 and the parked vehicle 114 within the parking location 500, such as the perpendicular parking configuration. The parked vehicle 108 and/or the parked vehicle 114 automatically calculate the useable space based on the gaps. Furthermore, the parked vehicle 108 and/or the parked vehicle 114 determine whether the useable space exceeds the dimensions of the arriving vehicle 102 to ensure that movement of the parked vehicle 108 and/or the parked vehicle 114 creates a parking space that receives the arriving vehicle 102. The parked vehicle 108 and/or the parked vehicle 114 identify a parking space 520 availability in response to determining the useable space exceeds the dimensions of the arriving vehicle 102.

Figure 6:
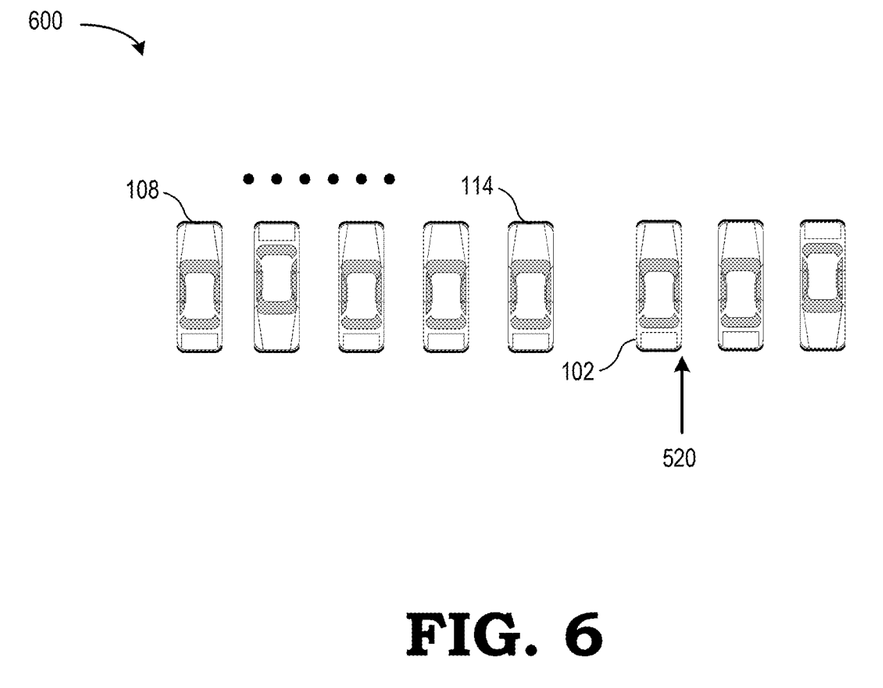
FIG. 6 is a diagram illustrating an example of the parking system of FIG. 1 after the arriving vehicle has automatically parked in the parking space created by the automatic movement of the plurality of vehicles in FIG. 6 in accordance with some embodiments.

FIG. 6 illustrates an example of the arriving vehicle 102 after the arriving vehicle 102 has automatically parked in the parking space 520 created by autonomous movement of the parked vehicle 108 and/or the parked vehicle 114 in FIG. 5 in accordance with some embodiments. The parked vehicle 108 and/or the parked vehicle 114 automatically move to adjust the useable space to create the parking space 520 in response to determining the useable space exceeds the dimensions of the arriving vehicle 102. As such, the arriving vehicle 102 automatically moves and/or parks within the parking space 520 in response to movement of the parked vehicle 108 and/or the parked vehicle 114 to create the parking space 520. In different embodiments, the arriving vehicle 102 automatically moves and/or parks in response to detecting all passengers within the arriving vehicle 102 have exited. Furthermore, the arriving vehicle 102 automatically adjusts positioning by moving in a first lateral direction (i.e., forward), a second lateral direction (i.e., backward), a first rotational direction (e.g., right) with respect to a perpendicular axis to the arriving vehicle 102, and/or a second rotational direction (e.g., left) with respect to the perpendicular axis to the arriving vehicle 102 to move within the parking space 520. In some embodiments, the arriving vehicle 102, the parked vehicle 108, and/or the parked vehicle 114 maximize the useable space of the parking space 520 by excluding the space used to open each door of the arriving vehicle 102. Stated differently, the parked vehicle 108 and/or the parked vehicle 114 adjust positioning within the parking location 500 to receive the arriving vehicle 102 within the parking space 520 and excluding space to open each door of the arriving vehicle within the parking space 520. As such, the parked vehicle 108, and/or the parked vehicle 114 create the parking space 520 based on all passengers within the arriving vehicle 102 exiting the arriving vehicle 102 prior to the arriving vehicle 102 automatically moving to park within the parking space 520.

Figure 7:
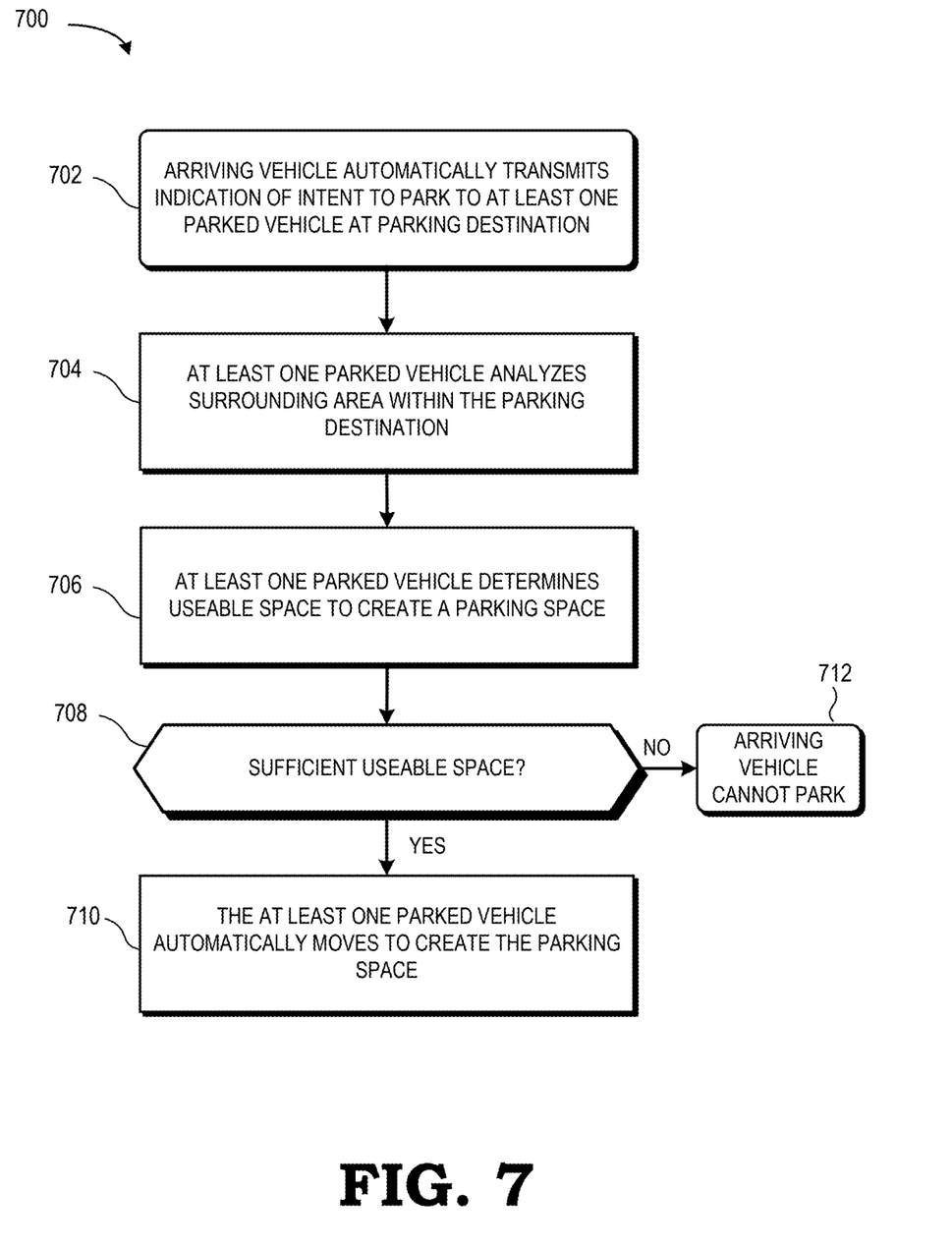
FIG. 7 is a flow diagram illustrating a method for automatically rearranging vehicles at a parking location in accordance with some embodiments.

FIG. 7 illustrates a flow diagram for a method 800 to automatically rearrange vehicles at a parking location in accordance with some embodiments. The method 700 is described with respect to an example implementation of the image capturing device 100 of FIG. 1. At block 702, the arriving vehicle 102 automatically sends the first communication signal to the parked vehicle 108 and/or the parked vehicle 114 indicating the intent to park at a parking location.

At block 704, the parked vehicle 108 and/or the parked vehicle 114 analyze the surrounding area at the parking location. Specifically, the at least one sensor 112 and/or the at least one sensor 118 detect the surrounding environment around the parked vehicle 108 and the parked vehicle 114, respectively. For example, the at least one sensor 112 and/or the at least one sensor 118 stores an image of the surrounding environment, detects proximity to at least one other vehicle, non-movable objects, at least one person or animal, or detects movement of the at least one other vehicle and/or the at least one person or animal.

At block 706, the parked vehicle 108 and/or the parked vehicle 114 determine the useable space that would fit the dimensions of the arriving vehicle 102 including length, width, and height. Additionally, the parked vehicle 108 and/or the parked vehicle 114 identify which of the plurality of vehicles and/or objects are a communicating vehicle and/or a non-movable object in response to analyzing the surrounding environment. In other words, the parked vehicle 108 and/or the parked vehicle 114 identify which of the plurality of vehicles are responsive to communications in order to move to create the parking space.

At block 708, the parked vehicle 108 and/or the parked vehicle 114 send at least one second communication signal to each other to indicate to each other whether there is sufficient useable space to create the parking space. Specifically, the parked vehicle 108 and/or the parked vehicle 114 indicate whether the parking space created from movement of the parked vehicle 108 and/or the parked vehicle 114 exceeds the dimensions of the arriving vehicle 102.

At block 710, the parked vehicle 108 and/or the parked vehicle 114 automatically move to adjust the useable space to create the parking space in response to determining the useable space exceeds the dimensions of the arriving vehicle 102. Subsequently, the arriving vehicle 102 automatically moves and/or parks within the parking space in response to movement of the parked vehicle 108 and/or the parked vehicle 114 to create the parking space.

At block 712, the parked vehicle 108 and/or the parked vehicle 114 are unable to create the parking space to receive the arriving vehicle. For example, the parked vehicle 108 and/or the parked vehicle 114 determine the parking space cannot be created based on, for example, the useable space being less than the dimensions of the arriving vehicle 102, an insufficient number of the plurality of vehicles within the parking location cannot be moved to create the parking space, the positioning of the non-communicating vehicles and/or the non-movable objects in the surrounding environment prevent creation of the parking space, and any combination thereof.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving, by a plurality of parked vehicles, a first communication signal from a first vehicle indicating a request to park at a parking location, wherein the parking location is bounded by the plurality of parked vehicles;
    automatically moving at least one parked vehicle within the parking location to create a parking space within the parking location for the first vehicle to park in response to receiving the first communication signal and the parked vehicles determining the parking space created from useable space around the parking location is sufficient to allow the first vehicle to park.

2. The method of claim 1, wherein the at least one parked vehicle is at least partially autonomous and moves autonomously during parking and moving to create the parking space.

3. The method of claim 1, wherein determining the parking space comprises:
    calculating dimensions of the first vehicle and calculating that the useable space exceeds the dimensions of the first vehicle, wherein the dimensions include a height of the first vehicle.

4. The method of claim 1, further comprising:
    detecting the useable space based on sensor readings by the at least one parked vehicle.

5. The method of claim 1, further comprising:
    sending orientation of the at least one parked vehicle within the parking location in response to determining orientation of the at least one parked vehicle within the parking location prior to moving to create the parking space.

6. The method of claim 1, further comprising:
    calculating a safety margin for at least one of the first vehicle and the at least one parked vehicle with respect to each other and at least one non-movable object that facilitates entry or departure of the first vehicle and the at least one parked vehicle from the parking location.

7. The method of claim 1, further comprising:
    delaying movement of the at least one parked vehicle to create the parking space until the first vehicle is within a threshold distance from the parking space.

8. The method of claim 7, wherein the at least one parked vehicle delays movement in response to detection of at least one other first vehicle.

9. The method of claim 8, wherein the at least one parked vehicle identifies the at least one other first vehicle as a non-communicating vehicle that is unresponsive to a second communication signal from the at least one parked vehicle.

10. The method of claim 1, further comprising:
    moving at least one of the at least one parked vehicle and the first vehicle to facilitate departure of the at least one parked vehicle or the first vehicle in response to receiving a second communication signal indicating an intent to depart from the parking location.

11. The method of claim 1, further comprising:
    categorizing at least one of the first vehicle and the at least one parked vehicle as a non-movable object in response to at least one of the first vehicle and the at least one parked vehicle being unresponsive to a second communication signal.

12. A parking system comprising:
    a communication unit of at least one parked vehicle configured to:
        receive a communication signal from a first vehicle indicating an intent to park at a parking location, wherein the parking location is bounded by a plurality of parked vehicles; and
    a processor of the at least one parked vehicle configured to:
        determine a parking space created from useable space within the parking location; and
        control movement of the at least one parked vehicle within the parking location to create the parking space within the parking location in response to the communication unit receiving the intent to park from the first vehicle.

13. The parking system of claim 12, wherein the communication unit is further configured to:
    communicate to the first vehicle through a cloud service.

14. The parking system of claim 13, wherein the communication unit connects to the cloud service based on a tiered level of service.

15. The parking system of claim 13, wherein the processor identifies the first vehicle as a non-communicating vehicle based on a selection in the cloud service.

16. The parking system of claim 12, wherein the processor identifies at least one non-movable object during determination of the useable space.

17. A method comprising:
    receiving, by at least one autonomous parked vehicle, a communication signal from an autonomous first vehicle of an intent to park at a parking location, wherein the parking location is bounded by a plurality of parked vehicles;
    determining, by the at least one autonomous parked vehicle, a parking space within the parking location created from useable space within the parking location; and
    moving the at least one autonomous parked vehicle within the parking location to create the parking space in response to receiving the intent to park from the autonomous first vehicle.

18. The method of claim 17, wherein the autonomous first vehicle parks subsequent to exit of each passenger from the autonomous first vehicle.

19. The method of claim 17, wherein the at least one autonomous parked vehicle maximizes the useable space used to create the parking space by adjusting positioning within the parking location.

20. The method of claim 17, wherein the at least one autonomous parked vehicle maximizes the useable space by excluding space to open each door of the autonomous first vehicle.

* * * * *